United States Patent [19]
Imai et al.

[11] Patent Number: 5,973,498
[45] Date of Patent: *Oct. 26, 1999

[54] EDM WITH JUMP MOTION DETECTING REACTIVE FORCE

[75] Inventors: Yoshihito Imai; Hidetaka Miyake, both of Amagasaki; Takuji Magara; Akihiro Goto, both of Nagoya, all of Japan

[73] Assignee: Mitsubishi Denki Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/568,682

[22] Filed: Dec. 7, 1995

[30] Foreign Application Priority Data

Dec. 7, 1994 [JP] Japan .................................. 6-303776

[51] Int. Cl.$^6$ .................................................. G01N 27/60
[52] U.S. Cl. ..................... 324/452; 219/69.2; 219/69.16; 324/72; 324/403
[58] Field of Search .............................. 324/457, 72, 452, 324/403; 219/69, 69.15, 69.16, 69.17, 69.18, 69.2, 69.13

[56] References Cited

U.S. PATENT DOCUMENTS

| | | | |
|---|---|---|---|
| 3,705,286 | 12/1972 | Kondo | 219/69 |
| 4,582,974 | 4/1986 | Itoh | 219/69 |
| 4,703,144 | 10/1987 | Goto et al. | 219/69 |
| 5,117,083 | 5/1992 | Kawamura | 219/69.16 |
| 5,340,959 | 8/1994 | Sawada et al. | 219/69.15 |
| 5,496,984 | 3/1996 | Goto et al. | 219/69.18 |
| 5,500,500 | 3/1996 | Mohri et al. | 219/69.17 |

FOREIGN PATENT DOCUMENTS 4-31806 of 1992 Japan .
5-104333 of 1993 Japan .

OTHER PUBLICATIONS

"Study on The Characteristics of Electrical Discharge Machining (EDM) in Real Operation", Journal of the Japan Society of Electrical–Machining Engineers. 20, No. 39, pp. 19–29, 1987. Mohri et al.

Primary Examiner—Josie Ballato
Assistant Examiner—Thomas Valone
Attorney, Agent, or Firm—Sughrue, Mion, Zinn, Macpeak & Seas, PLLC

[57] ABSTRACT

An electric discharge machine for machining a workpiece by an electric discharge by supplying a machining fluid to a gap between an electrode and the workpiece and supplying pulses to the workpiece while providing the electrode with a jump motion, said jump motion being a periodic motion of the electrode relative to the workpiece; wherein said electric discharge machine detects a state quantity caused in a main body of the electric discharge machine by a reactive force produced by a machining operation in the gap between the electrode and the workpiece and changes machining conditions of the workpiece in accordance with a detected value of the state quantity.

9 Claims, 9 Drawing Sheets

CONVENTIONAL JUMP OPERATION

FIG. 3B

INVENTED JUMP OPERATION

EDM WITH JUMP MOTION DETECTING REACTIVE FORCE

BACKGROUND OF THE INVENTION

1. Field of the Invention

The present invention relates to an electric discharge machine, particularly to an electric discharge machine which, in case where the main body of the electric discharge machine is deformed by a reactive force caused by the electric discharge machining, controls the reactive force or a deformation of the main body of the electric discharge machine within a certain value or at a constant amount.

2. Discussion of Background

Figure 6:
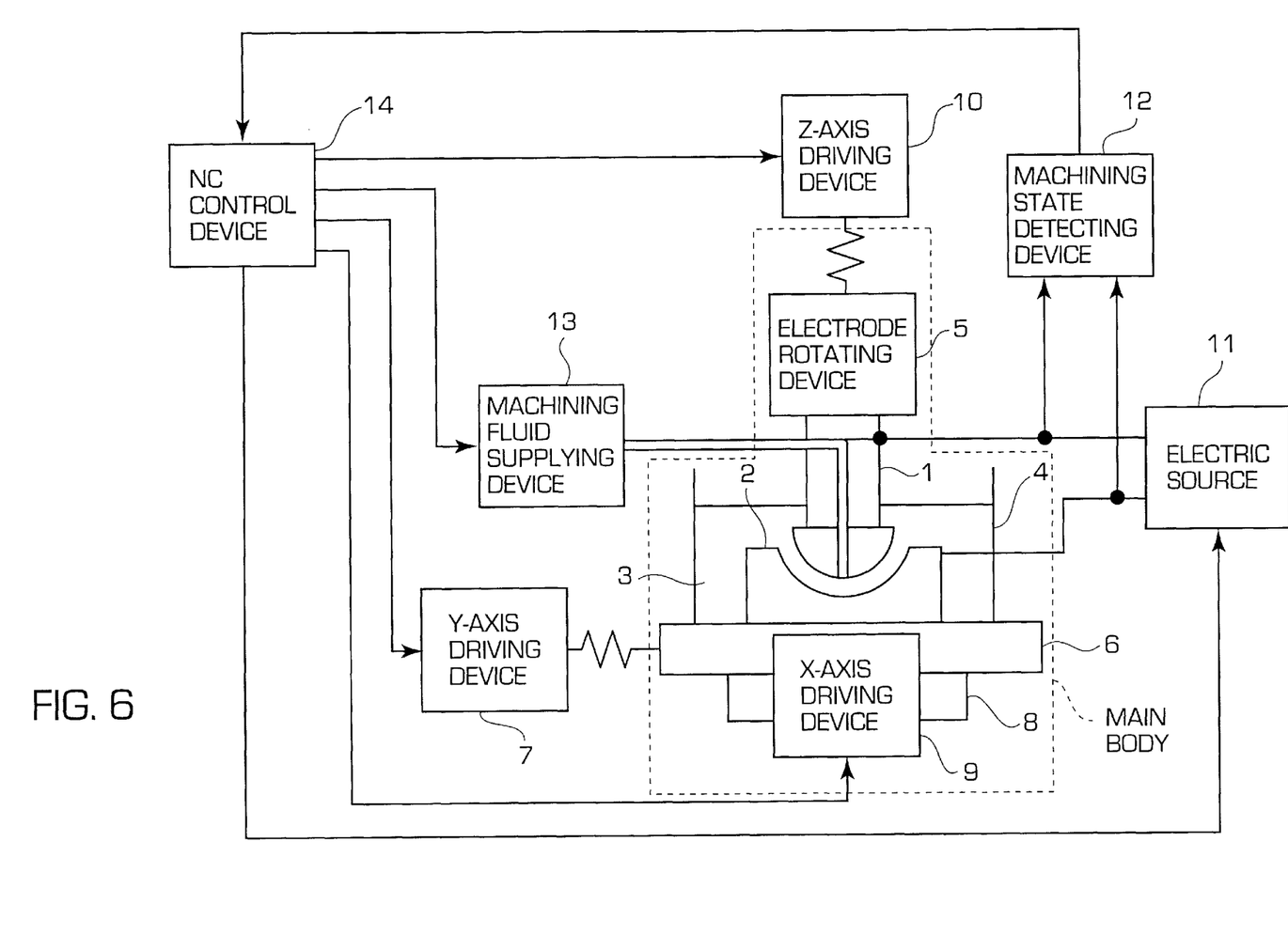
FIG. 6 is a diagram showing the structure of a conventional electric discharge machine.

FIG. 6 is a structural view of a general type of a conventional electric discharge machine.

Figure 7:
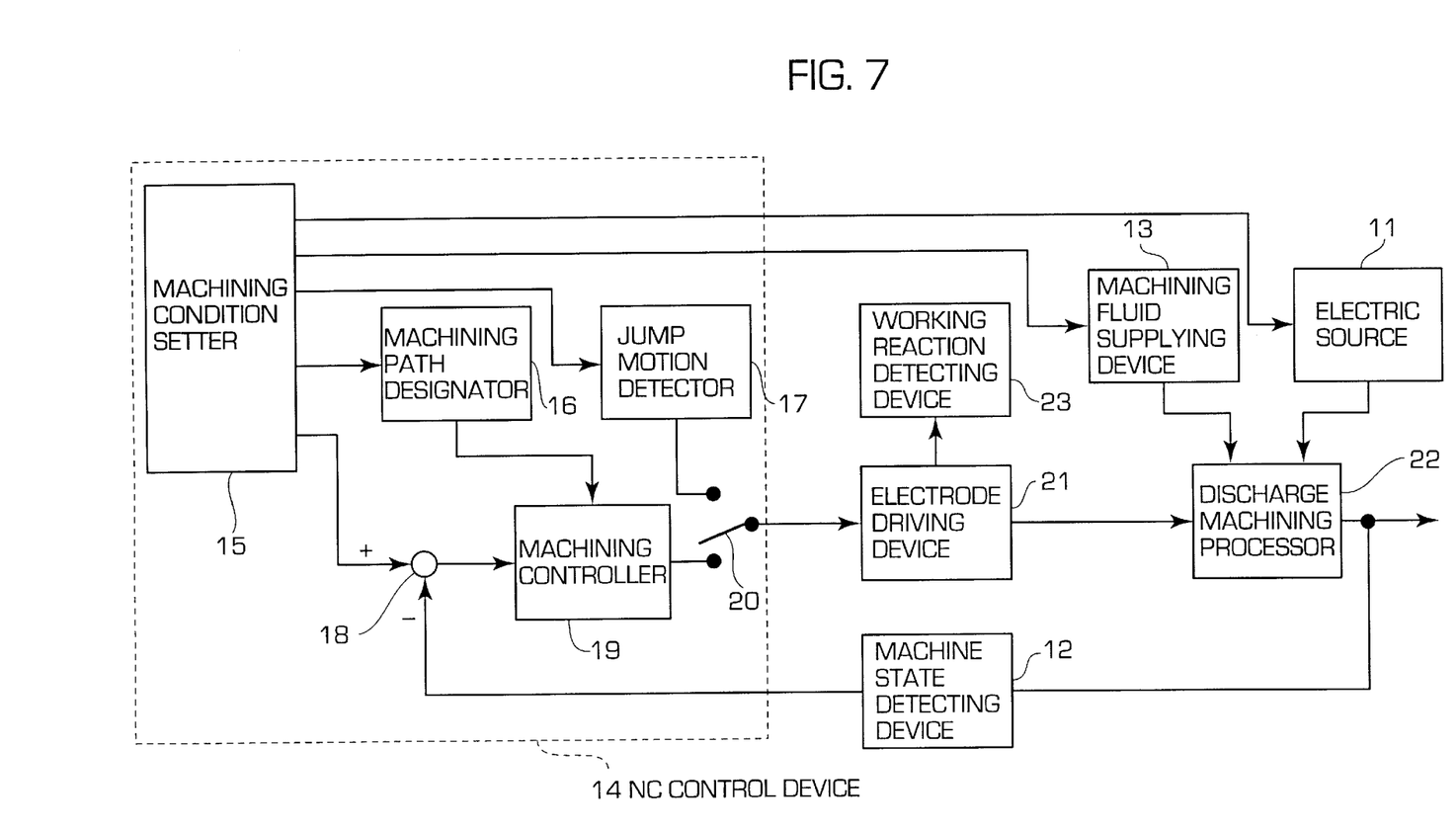
FIG. 7 is a block diagram showing the operation of a conventional electric discharge machine.

In FIG. 6, numeral 1 designates an electrode, numeral 2 designates a workpiece, numeral 3 designates a machining fluid, numeral 4 designates a machining tank, numeral 5 designates an electrode rotating device rotating the electrode 1 around a Z axis, numeral 6 designates a Y-axis table, numeral 7 designates a Y-axis driving device driving the Y-axis table, numeral 8 designates a X-axis table, numeral 9 designates a X-axis driving device driving the X-axis table, numeral 10 designates a Z-axis driving device driving the electrode rotating device 5 attached with the electrode 1 in Z-axis direction, numeral 11 designates an electric source supplying pulses between the electrode 1 and the workpiece 2, numeral 12 designates a machining state detecting device detecting a machining state in machining, numeral 13 designates a machining fluid supplying device supplying the machining fluid to the gap of machining and numeral 14 designates a NC control device. FIG. 7 is a block diagram for explaining the operation of the electric discharge machine shown in FIG. 6. In FIG. 7, parts 11, 12, 13 and 14 are the same as those in FIG. 6. Numeral 15 designates a machining condition setter setting various machining conditions to the electric source 11, the machining fluid supplying device 13, a machining path designator 16, a jump motion controller 17 and a comparator 18. The numeral 16 designates the machining path designator generating a path for machining the workpiece in a desired shape, an electrode planetary pattern and the like, the numeral 17 designates the jump motion controller for having the electrode 1 rise and fall during the machining operation, the numeral 18 is the comparator, a numeral 19 designates a machining controller and numeral 20 designates a machining/jump motion switcher. The operation of these parts 15 through 20 is generally realized by a program in the NC control device 14. Numeral 21 designates an electrode driving device which is constituted by the electrode rotating device 5, the respective axis tables and the respective axis driving devices 6 through 10. Numeral 22 designates a discharge machining process indicating a discharge machining phenomenon caused between the electrode 1 and the workpiece 2 opposedly arranged in the machining fluid 3.

Next, an explanation will be given of the operation.

In a normal electric discharge machine a gap distance control system is constituted for adjusting a gap between the electrode 1 and the workpiece 2 for machining the workpiece in a desired shape while maintaining a stable machining state. The control system compares a reference instruction value set by the machining condition setter 15 with a detected value indicating the electric discharge machining process 22 that is detected by the machining state detecting device 12, by the comparator 18, calculates a deviation and issues an electrode movement instruction based on an instruction from the machining path designator 16 such that the deviation is nullified by the machining controller to thereby control the gap between the electrode 1 and the workpiece 2. Further, the machining is finished at a time point where the electrode movement instruction value becomes a final instruction value of the desired shape. In this case machining is selected in the machining/jump motion switcher 20.

The NC control device 24 has a function of the jump motion control as well as a function of the gap distance control. In the jump motion the machining/jump motion switcher 20 forcibly switches the gap distance control to the jump motion whereby the electrode 1 is risen and fallen. This jump motion is important in view of stabilizing the machining state by evacuating debris from the gap of machining by its pumping operation.

However, in such an electric discharge machine a large positive pressure or negative pressure (hereinafter reactive force by working or working reaction) is operated on the electrode in rising or falling of the electrode in the jump motion, in case where the electrode is especially large or the gap of machining is very narrow as in a finishing operation or the depth of machining is large whereby the main body of the electric discharge machine is deformed and the machining accuracy is deteriorated. According to a research by Mohri et al at Toyoda Institute of Technology "Study on The Characteristics of Electrical Discharge Machining (EDM) in Real Operation", Journal of the Japan Society of Electrical-Machining Engineers, vol. 20, No. 39, p.19–29, 1987, the above-mentioned force operating on the electrode is caused by the viscosity of a machining fluid and a force operating on the electrode when the electrode is falling, especially causes the deterioration of the machining accuracy.

Figure 8A:
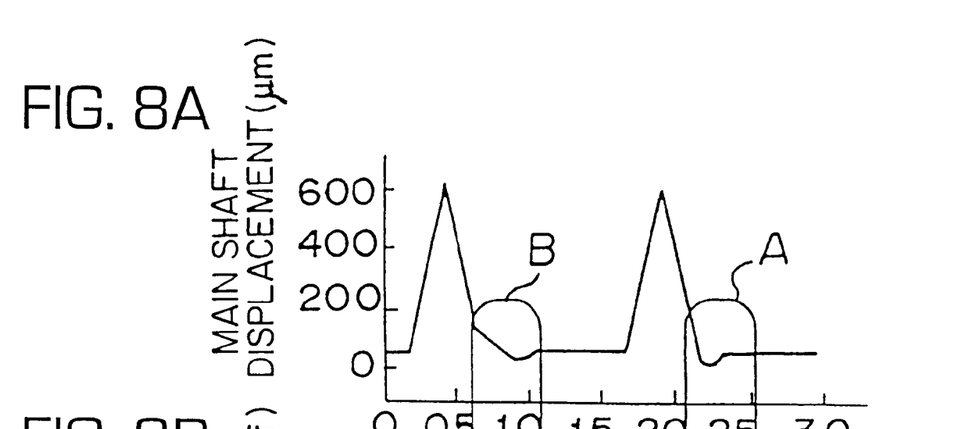
FIGS. 8A, 8B and 8C illustrate diagrams measuring a reactive force by a machining operation caused by the viscosity of a machining fluid in jump motion.
Figure 8B:
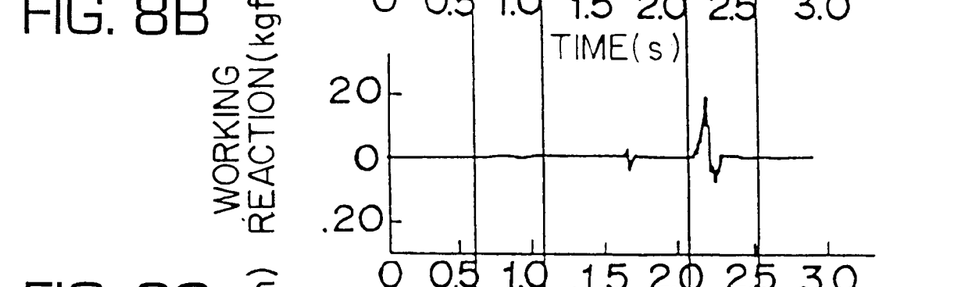
Figure 8C:
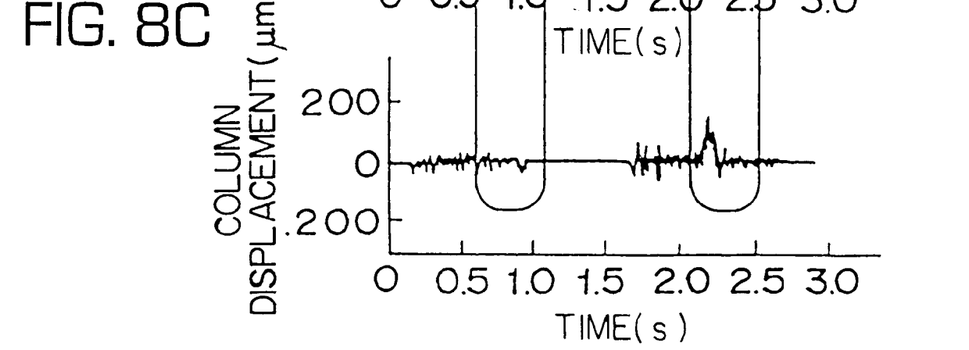

FIGS. 8A, 8B and 8C illustrate a main shaft displacement, a working reaction and a column displacement in a jump motion actually measured by Mohri et al. As is apparent from a portion A in the figures the working reaction is maximized when the electrode is falling. Incidentally, in these figures the main shaft designates the Z axis and the column indicates the main body of the machine supporting the Z axis, respectively and the working reaction is measured by a force sensor integrated in an electrode attaching jig.

To solve the above-mentioned problem Mohri et al proposed that the rigidity of the machine is to be enhanced by a planer-type structure and the working reaction is to be alleviated by reducing an electrode falling speed immediately before the falling of the electrode is finished to thereby decrease the deformation of the column.

A portion B in FIG. 8 shows that the working reaction is smaller than that in the portion A and hence the amount of displacement of the column is reduced. This is due to the decelerated falling speed of the main shaft in the portion B that is a result supporting the proposal of Mohri et al.

Figure 9:
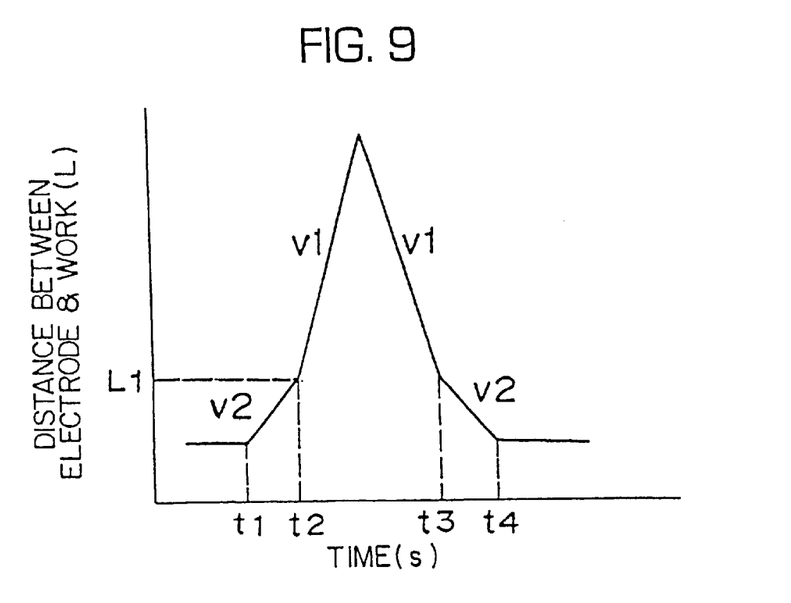
FIG. 9 is a diagram showing a jump motion in a conventional electric discharge machine.

Japanese Examined Patent Publication No. 31806/1992 discloses a method of controlling an electrode speed in the jump motion based on the same conception. As shown in FIG. 9 in this method the speed is changed in rising and falling of the electrode in accordance with a distance between the electrode and the workpiece. In FIG. 9, in rising of the electrode the electrode rising speed is accelerated from v2 to v1 at a distance L1 between the electrode and the workpiece and in falling of the electrode the electrode falling speed is decelerated from v1 to v2 at the distance L1 between the electrode and the workpiece by which the positive pressure and the negative pressure operating on the electrode are alleviated.

Figures 10A, 10B:
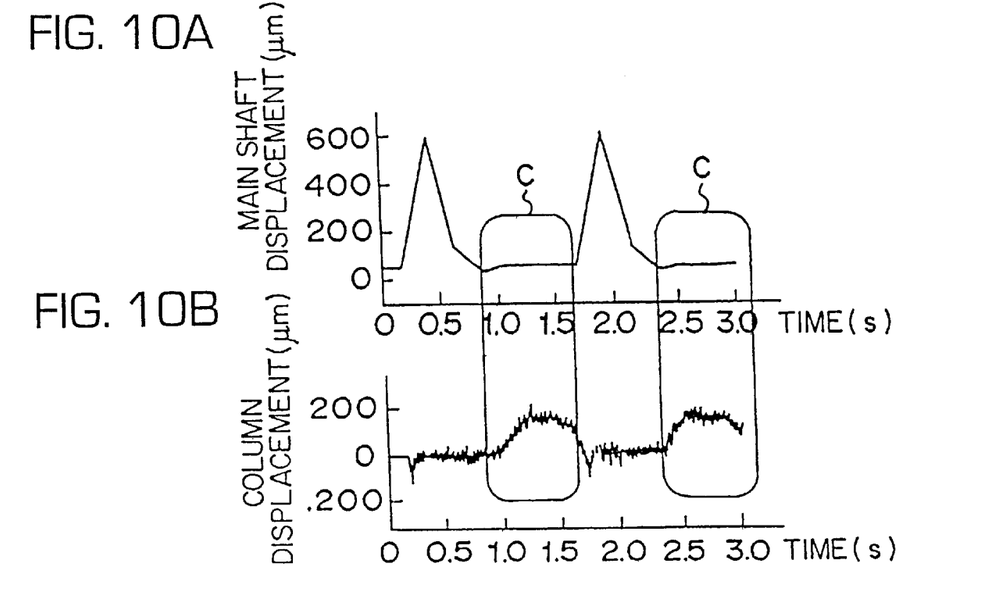
FIG. 10 illustrates diagrams measuring a reactive force by a machining operation bubbles generated by vaporizing a machining fluid in discharging.

Incidentally, in the paper of Mohri et al the area of the electrode is described only up to approximately 20 cm². FIG. 10 indicates the main shaft displacement and the column displacement in a finishing operation while performing a jump operation in which an electrode having the area of the electrode of approximately 1000 cm² is used. In the jump operation the electrode falling speed is controlled to decelerate immediately before the electrode falling is finished. Therefore, although a column displacement is caused in rising of the electrode, almost no column displacement is caused in falling the electrode. However, a noteworthy point in FIG. 10 in comparison with FIG. 8 is that a large column displacement is caused at portions C during time periods in which electric discharge is generated between the electrode and a workpiece (hereinafter, in discharging). There has been no description with regard to the phenomenon in which the column displacement is caused in discharging.

The column displacement shown here is caused not only by a force due to the viscosity of a machining fluid which has conventionally been recognized but by a pressure of a great number of bubbles generated at that occasion by vaporizing the machining fluid confined in the gap of machining by a continuous electric discharge. Therefore, the column deformation is not limited to that in the jump operation. What influences on the actual machining accuracy is predicted to be rather the column displacement in discharging mentioned here than the above-mentioned column displacement in rising and falling of the electrode.

As stated above the conventional electric discharge machine cannot deal with the force received by the electrode by accumulating the bubbles of the machining fluid generated in discharging at the gap between the electrode and the workpiece. Accordingly, the main body of the electric discharge machine is deformed by the pressure of the bubbles causing a work shape error due to the deformation of X, Y and Z axes to be orthogonal to each other and a working dimension error due to the change of the reference position per se and accordingly a sufficient machining accuracy cannot be realized. Further, the machining is finished at a time point when the electrode movement instruction value becomes the final instruction value of the desired shape without considering the deformation of the main body of the machine and accordingly, the work shape error is caused. Moreover, the force acting on the electrode operates as a disturbance to the gap distance control system and a stable machining state cannot be maintained when the pressure is rapidly changed in case where the bubbles are detached from the gap of machining or the bubbles are liquefied again, giving rise to the lowering of the machining speed.

SUMMARY OF THE INVENTION

It is an object of the present invention to resolve the above-mentioned problem and to realize an electric discharge machine capable of improving lowering of machining accuracy and machining speed caused by a reactive force by working generated especially in discharging.

According to a first aspect of the present invention, there is provided an electric discharge machine for machining a workpiece by an electric discharge by supplying a machining fluid to a gap between an electrode and the workpiece and supplying pulses to the workpiece while providing the electrode with a jump motion, said jump motion being a periodic motion of the electrode relative to the workpiece;

wherein said electric discharge machine detects a state quantity caused in a main body of the electric discharge machine by a reactive force produced by a machining operation in the gap between the electrode and the workpiece and changes machining conditions of the workpiece in accordance with a detected value of the state quantity.

According to a second aspect of the present invention, there is provided the electric discharge machine according to the first aspect, wherein the state quantity is an amount of a force caused in the main body of the electric discharge machine corresponding to the reactive force.

According to a third aspect of the present invention, there is provided the electric discharge machine according to the first aspect, wherein the state quantity is an amount of a deformation caused in the main body of the electric discharge machine corresponding to the reactive force.

According to a fourth aspect of the present invention, there is provided the discharge machining device according to the first aspect, wherein the machining conditions to be changed include at least one selected from the group consisting of an onset timing of the jump motion, a continuous time period of the pulses, on and/or off time periods of each of the pulses, a current value and/or a gap voltage of the pulses, a switching of sucking and exhausting the machining fluid, an amount of sucking and/or exhausting the machining fluid and a pressure of sucking and/or exhausting the machining fluid.

According to a fifth aspect of the present invention, there is provided an electric discharge machine for machining a workpiece by an electric discharge by supplying a machining fluid to a gap between an electrode and the workpiece and supplying pulses to the workpiece while providing the electrode with a jump motion, said jump motion being a periodic motion of the electrode relative to the workpiece;

wherein said electric discharge machine detects a reactive force produced by a machining operation in the gap between the electrode and the workpiece or an amount of a deformation caused in a main body of the electric discharge machine by the reactive force and performs a second jump motion restraining the reactive force in accordance with the reactive force or the amount of the deformation.

According to a sixth aspect of the present invention, there is provided an electric discharge machine for machining a workpiece by an electric discharge by supplying a machining fluid to a gap between an electrode and the workpiece and supplying pulses to the workpiece while providing the electrode with a jump motion, said jump motion being a periodic motion of the electrode relative to the workpiece;

wherein said electric discharge machine detects a reactive force produced by a machining operation in the gap between the electrode and the workpiece or an amount of a deformation caused in a main body of the electric discharge machine by the reactive force and determines that the machining operation on the workpiece has been finished when the detected value is equal to or less than a predetermined value.

According to a seventh aspect of the present invention, there is provided an electric discharge machine for machining a workpiece by an electric discharge by supplying a machining fluid to a gap between an electrode and the workpiece and supplying pulses to the workpiece while providing the electrode with a jump motion, said jump motion being a periodic motion of the electrode relative to the workpiece;

wherein said electric discharge machine detects a reactive force produced by a machining operation in the gap between the electrode and the workpiece or an amount of a deformation caused in a main body of the electric discharge machine by the reactive force and corrects a path of the machining operation determining a position of the electrode relative to the workpiece.

According to the first aspect of the electric discharge machine the state quantity caused in the main body of the electric discharge machine by the reactive force produced by the machining operation in the gap between the electrode and the workpiece is detected and the machining conditions of the workpiece are changed in accordance with the detected value by which a stable working is provided and the machining speed and the machining accuracy are improved.

According to the second aspect of the electric discharge machine the amount of the force caused in the main body of the electric discharge machine corresponding to the reactive force is detected as the state quantity in the first aspect by which a stable machining state is provided and the machining speed and the machining accuracy are improved.

According to the third aspect of the electric discharge machine the amount of the deformation caused in the main body of the electric discharge machine is detected as the state quantity in the first aspect by which a stable machining state is provided and the machining speed and the machining accuracy are improved.

According to the fourth aspect of the electric discharge machine at least one selected from the group consisting of an onset timing of the jump motion, a continuous time period of the pulses, on and/or off time periods of each of the pulses, a current value and/or a gap voltage of the pulses, a switching of sucking and exhausting the machining fluid, an amount of sucking and/or exhausting the machining fluid and a pressure of sucking and/or exhausting the machining fluid, is changed by which a stable machining state is provided and the machining speed and the machining accuracy are improved.

According to the fifth aspect of the electric discharge machine the reactive force produced by the machining operation in the gap between the electrode and the workpiece or the amount of the deformation caused in the main body of the electric discharge machine by the reactive force, is detected and the second jump motion restraining the reactive force in accordance with the reactive force or the amount of the deformation, is performed by which a stable machining state is provided and the machining speed and the machining accuracy are improved.

According to the sixth aspect of the electric discharge machine the reactive force produced by the machining operation in the gap between the electrode and the workpiece or the amount of the deformation caused in the main body of the electric discharge machine by the reactive force, is detected and the machining operation on the workpiece is determined to be finished when the detected value is equal to or less than the predetermined value by which a stable machining state is provided and the machining speed the machining accuracy are improved.

According to the seventh aspect of the electric discharge machine the reactive force produced by the machining operation in the gap between the electrode and the workpiece or the amount of the deformation caused in the main body of the electric discharge machine by the reactive force, is detected and the path of the machining operation determining the position of the electrode relative to the workpiece, is corrected by which a stable machining state is provided and the machining speed and the machining accuracy are improved.

DETAILED DESCRIPTION OF THE PREFERRED EMBODIMENTS

Embodiment 1

Figure 1:
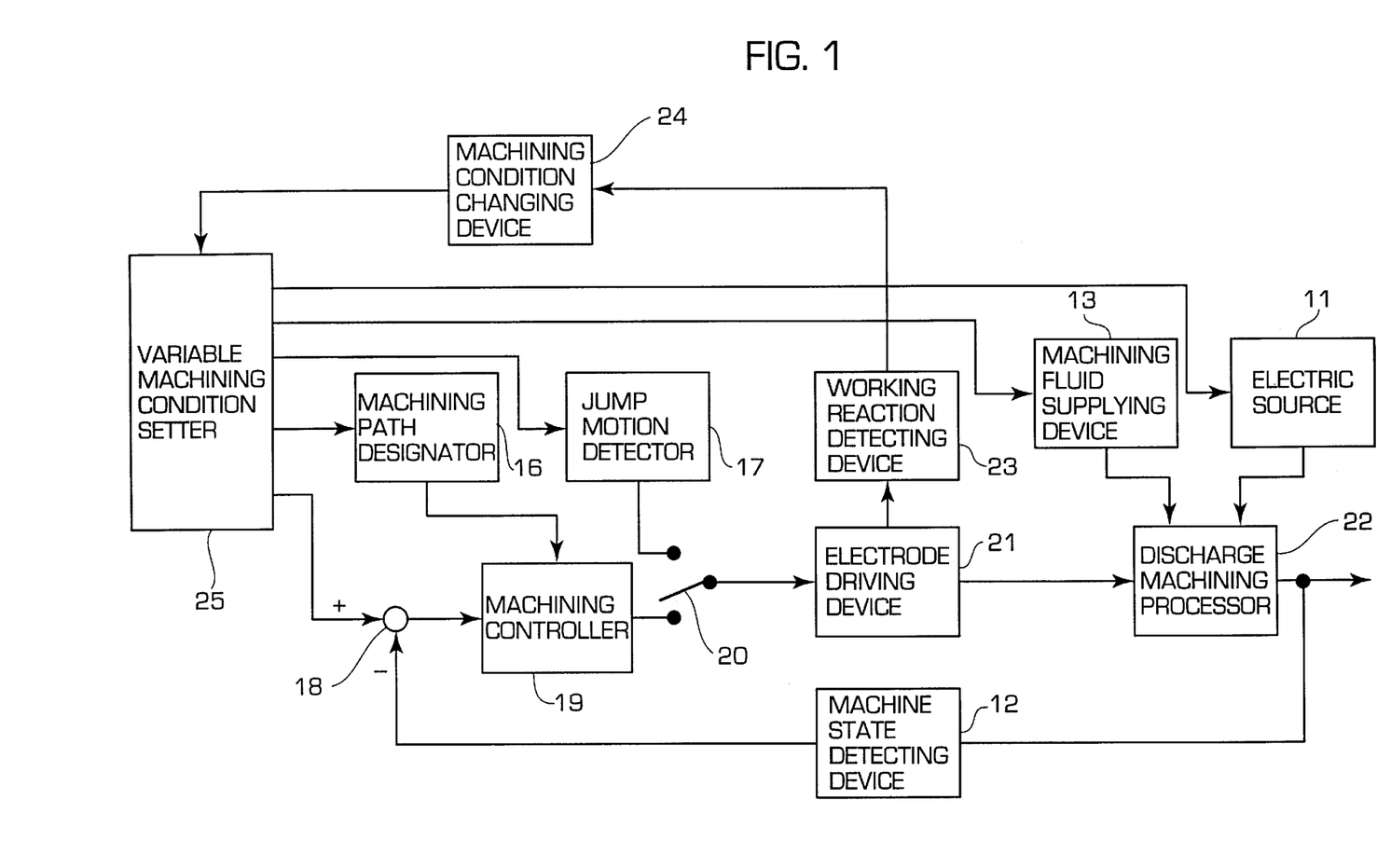
FIG. 1 is a block diagram showing the operation of an electric discharge machine in a first embodiment of the present invention.

An explanation will be given of a first embodiment of the present invention as follows. FIG. 1 is a block diagram explaining the operation of a first embodiment of an electric discharge machine. In FIG. 1 parts 11 through 13 and 16 through 22 are the same as those in the conventional example shown by FIG. 7. Numeral 23 designates a working reaction detecting device detecting a working reaction or a reactive force caused by a machining operation in discharging, numeral 24 designates a machining condition changing device and numeral 25 designates a variable machining condition setter different from the conventional machining condition setter and having a function capable of changing machining condition set values by an instruction from the machining condition changing device 24.

In this embodiment a working reaction in discharging is detected by the working reaction detecting device 23 and the machining condition changing device 24 instructs the change of the machining conditions to the variable machining condition setter 25 such that the detected value is not equal to or more than a predetermined value or stays constant. As the working reaction detecting device 23, for example, a motor current of the electrode driving device, a torque sensor attached to the electrode driving device, a force sensor attached to a jig for the electrode or the main body of the electric discharge machine or the like can be used. Further, as the machining conditions to be changed, one or combinations selected from the group consisting of an onset timing of the jump motion, a continuous time period of the pulses, on and/or off time periods of each of the pulses, a current value and/or a gap voltage of the pulses, a switching of sucking and exhausting the machining fluid, an amount of sucking and/or exhausting the machining fluid and a pressure of sucking and/or exhausting the machining fluid, can be used. As mentioned above the main cause of the working reaction is that bubbles generated by vaporizing the machining fluid by the electric discharge are confined in a narrow gap of machining. Therefore, when the above-mentioned machining conditions are changed, the bubbles in the gap of machining are restrained from generating, or the operation of letting the generated bubbles escape from the space of working is accelerated. As a result it is possible to promote the machining accuracy by restraining the deformation of the main body of the electric discharge machine caused by the working reaction.

Further, although in this embodiment the working reaction in discharging is detected by the working reaction detecting device 23, an amount of deformation of the main body of the electric discharge machine in discharging may be detected. In this case, as means of detecting the amount of deformation, for example, an optical length measuring equipment, an eddy current type length measuring equipment, a differential transformer type length measuring equipment, an ultrasonic type length measuring equipment, a strain gage and the like, can be used.

Although the explanation has been given of the first embodiment of the electric discharge machine, the working reaction detecting device 23, the machining condition changing device 24 and the variable machining condition setter 25 shown in FIG. 1 may respectively be constructed as exclusive devices or may be realized in the NC control device 14 as programs.

Embodiment 2

Figure 2:
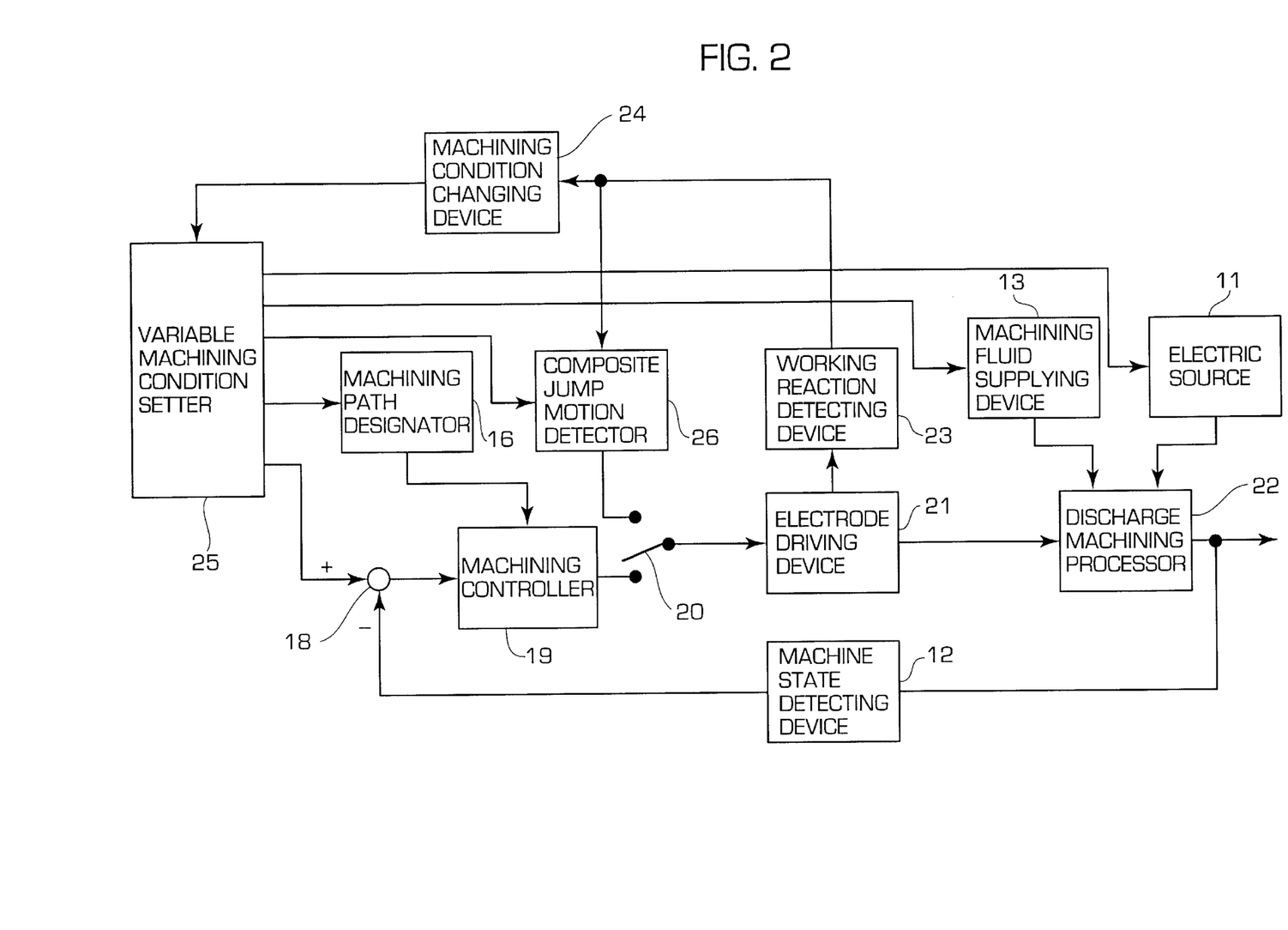
FIG. 2 is a block diagram showing the operation of an electric discharge machine in a second embodiment of the present invention.

An explanation will be given of a second embodiment of the present invention as follows. FIG. 2 is a block diagram explaining the operation of a second embodiment of an electric discharge machine. In FIG. 2 parts 11 through 13, 16 and 18 through 25 are the same as shown in Embodiment 1. Numeral 26 designates a composite-jump motion controller.

Figure 3A:
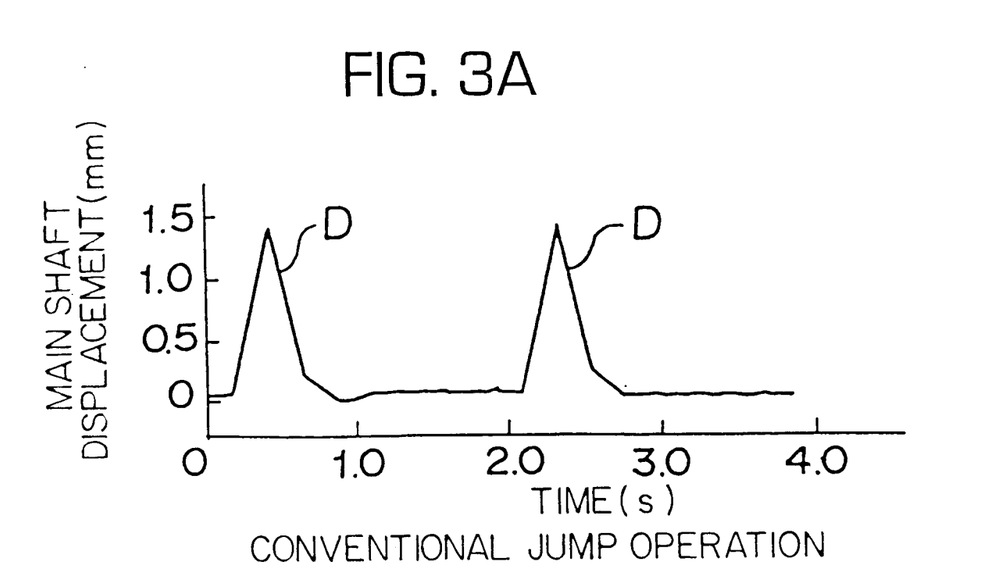
FIGS. 3A and 3B illustrate diagrams explaining a jump motion in the second embodiment of the present invention.
Figure 3B:
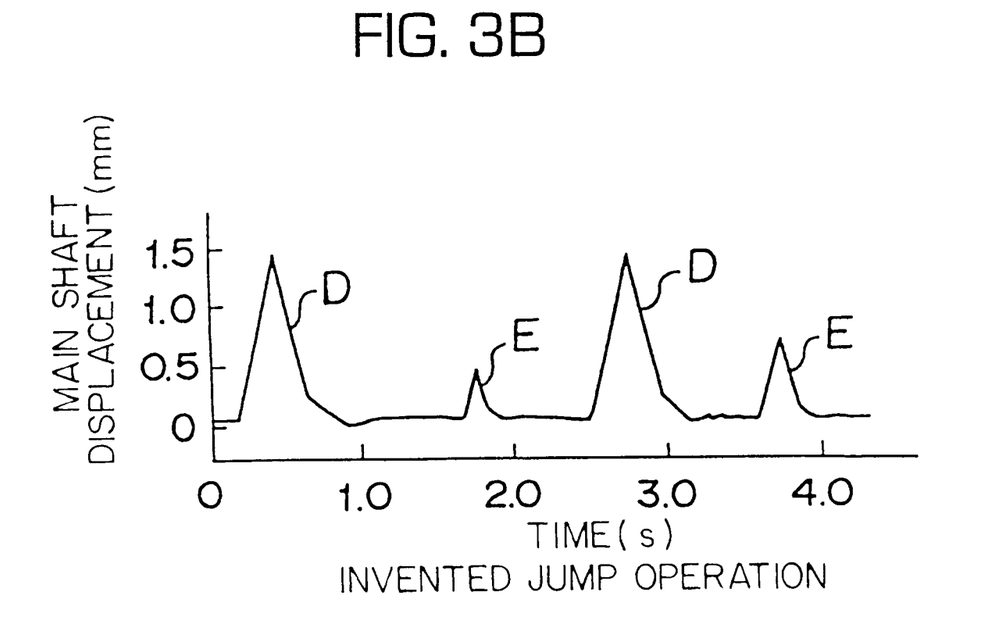

In this embodiment the working reaction in discharging is detected by the working reaction detecting device 23 and the composite-jump motion controller 26 controls a second jump motion such that the detected value becomes equal to or less than a predetermined value. FIGS. 3A and 3B indicate the jump motion by the conventional jump motion controller and the jump motion by the composite-jump motion controller of this embodiment. In FIGS. 3A and 3B notation D designates first jump motions corresponding to the conventional jump motions. Further, notation E designates second jump motions which are pertinently performed in the intervals of the first jump motions. In the jump motion of this embodiment, in addition to the first jump motion for evacuating debris from the gap of working as in the conventional example, the working reaction is controlled based on the detected value which has been detected by the working reaction detecting device 23 and the onset of the jump motion and a jump rise distance are adaptively controlled in the second jump motion. Accordingly, the evacuation of debris from the gap of machining and at the same time the control of the working reaction can effectively be realized and the deformation of the main body of the electric discharging machine by the working reaction can be restrained while stably maintaining the machining state by which the machining speed and the machining accuracy can be promoted.

Further, the structure of the working reaction detecting device 23 in this embodiment and the machining conditions to be changed may be the same as those in Embodiment 1.

Further, the machining condition changing device 24 is not necessary in case where only the second jump motion is controlled and it is apparent in this case that the variable machining condition setter 25 is the same as the conventional machining condition setter.

Although in this embodiment the working reaction in discharging is detected by the working reaction detecting device 23, as explained in Embodiment 1, the amount of deformation of the main body of the electric discharge machine in discharging may be detected. The means for detecting the amount of deformation may be the same as those in Embodiment 1. It is naturally possible to combine the embodiment with the function of Embodiment 1.

Although the explanation has been given of the second embodiment of the electric discharge machine, the composite-jump motion controller 26 in this embodiment may be constructed as an exclusive device or may be realized as a program in the NC control device 14.

Embodiment 3

Figure 4:
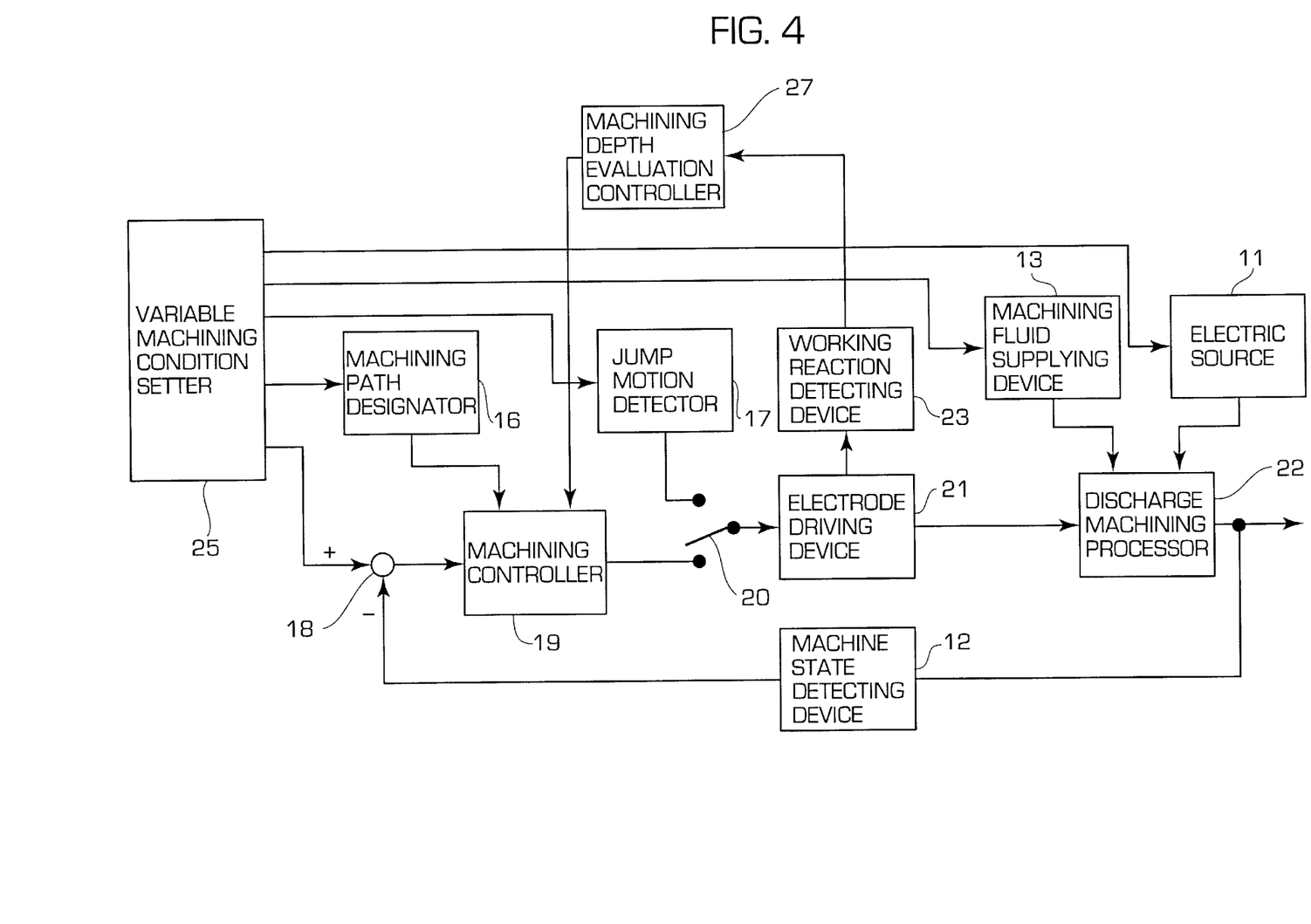
FIG. 4 is a block diagram showing the operation of an electric discharge machine in a third embodiment of the present invention.

An explanation will be given of a third embodiment of the present invention. FIG. 4 is a block diagram explaining the operation of the third embodiment of an electric discharge machine. In FIG. 4 notation 15 designates the conventional part as shown in FIG. 7 and parts 11 through 13, 16 through 18 and 20 through 23 are the same as those shown in Embodiment 1. Numeral 27 designates a machining depth evaluation controller and numeral 28 designates a machining controller with machining finish evaluation function different from the conventional machining controller and evaluating finishing of the machining operation based on an instruction from the machining depth evaluation controller 27.

In this embodiment the working reaction in discharging is detected by the working reaction detecting device 23 and the machining depth evaluating controller 27 issues an instruction evaluating the depth of machining to the machining controller with machining finish evaluating function 28 and evaluates the machining depth when the detected value is equal to or less than a certain value. That is, the finishing of the machining operation is determined when the amount of deformation of the main body of the electric discharge machine by the working reaction is equal to or less than an allowable value and accordingly the desired machining depth can accurately be machined.

Although the working reaction in discharging is detected by the working reaction detecting device 23 in this embodiment, as explained in Embodiment 1, the amount of deformation of the main body of the electric discharging machine in discharging may be detected and the machining depth may be evaluated based on the amount of deformation. Further, a deformation amount calculating device for calculating the amount of deformation from the working reaction may be provided. It is naturally possible to combine this embodiment with the functions of Embodiment 1 and/or Embodiment 2.

Although the explanation has been given to the third embodiment of the electric discharging machine, the machining depth evaluation controller 27 and the machining controller with machining finish evaluating function 28 may be constructed respectively as exclusive devices and may be realized in the NC control device 14 as programs.

Embodiment 4

Figure 5:
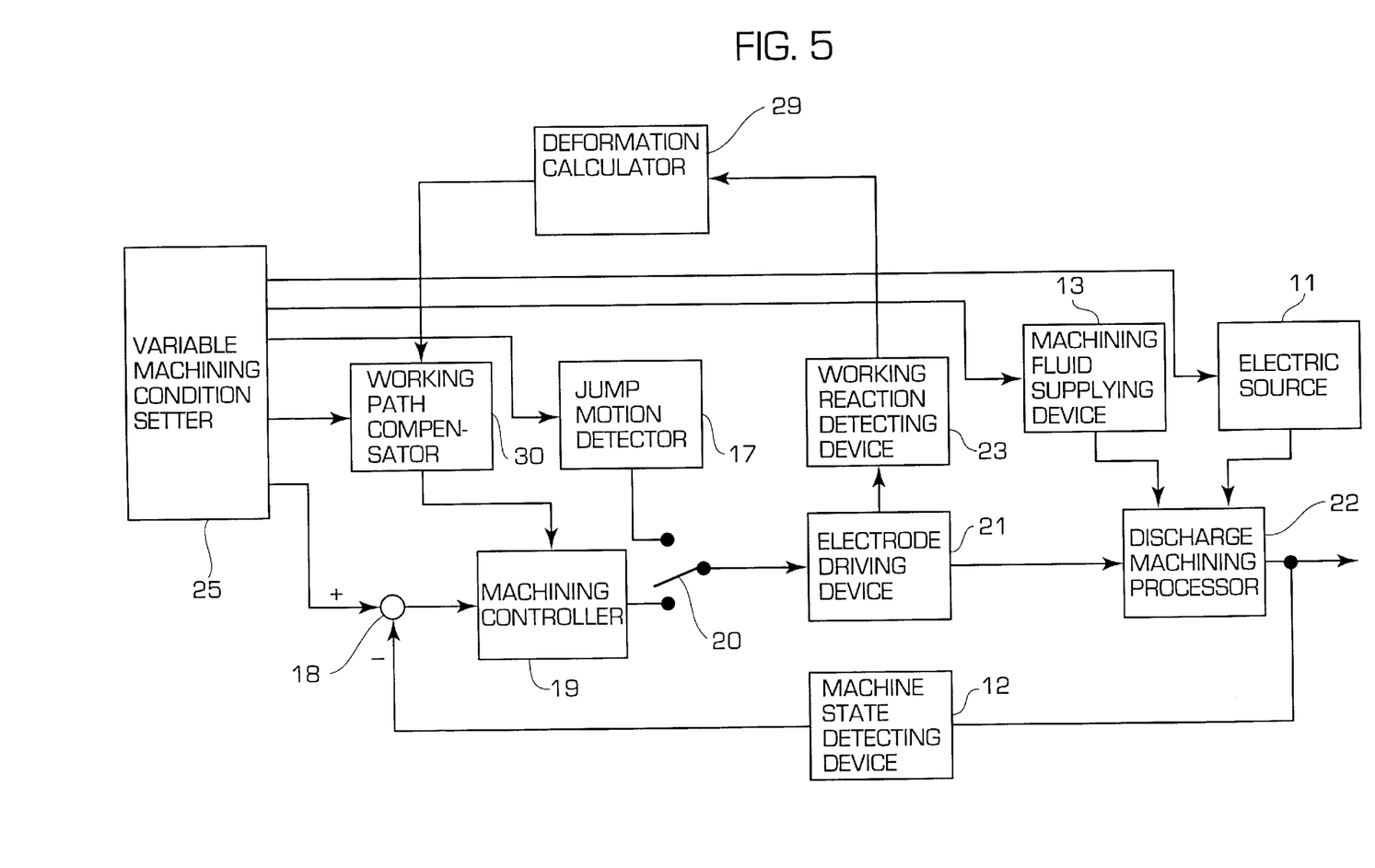
FIG. 5 is a block diagram showing the operation of an electric discharge machine in a fourth embodiment of the present invention.

An explanation will be given of a fourth embodiment of the present invention as follows. FIG. 5 is a block diagram explaining the operation of an electric discharge machine in the fourth embodiment. In FIG. 5 the part 15 is the same as the conventional one shown in FIG. 7 and the parts 11 through 13 and 17 through 23 are the same as those shown in Embodiment 1. Further, numeral 29 designates a deformation calculator calculating a deformation of the main body of the electric discharge machine by the working reaction detected by the working reaction detecting device 23 and numeral 30 designates a working path compensator with path correcting function which corrects a working path instruction based on an amount of deformation calculated by the deformation calculator 29.

In this embodiment the working reaction detecting device 23 detects the working reaction in discharging, the deformation calculator 29 calculates the amount of deformation of the main body of the electric discharge machine from the detected value and the working path compensator with path correcting function 30 issues the working path instruction after performing a correction based on the amount of deformation. Therefore, a highly accurate machining correcting the amount of deformation of the main body of the electric discharge machine can be realized.

In this embodiment, the working reaction in discharging is detected by the working reaction detecting device 23 and the amount of deformation of the main body of the electric discharging machine is calculated from the detected value by the deformation calculator 29. However, as has been explained in Embodiment 1, the amount of deformation of the main body of the electric discharge machine in discharging may directly be detected and the working path may be corrected based on the amount of deformation. It is naturally possible to combine the embodiment with the functions of either one or arbitrary two of the Embodiment 1 through Embodiment 3.

Although the explanation has been given of the electric discharging machine in the fourth embodiment, the working path compensator with path correcting function 30 shown in FIG. 5 may be constructed as an exclusive machine or may be realized in the NC control device 14 as a program.

According to the first aspect of the present invention the state quantity caused in the main body of the electric discharge machine by the reacting force produced by the machining operation in the gap between the electrode and the work piece, namely, the working reaction is detected and the machining conditions of the work piece are changed by the detected value by which the deformation of the main body of the electric discharge machine by the working reaction can be restrained. Therefore, both the machining speed and the machining accuracy are promoted while a stable machining state can be maintained.

According to the second aspect of the present invention the state quantity caused in the main body of the electric discharge machine by the working reaction between the electrode and the workpiece is detected as the force amount by a motor current of the electrode driving device, a torque sensor attached to the electrode driving device, a force sensor attached to a main body of the electrode, a jig for the electrode or the main body of the electric discharge machine, or the like and the deformation of the main body of the electric discharge machine by the working reaction can be restrained by changing the machining conditions of the workpiece by the detected value. Therefore, both the machining speed and the machining accuracy are promoted while a stable machining state can be maintained.

According to the third aspect of the present invention the state quantity caused in the main body of the electric discharging machine by the working reaction between the electrode and the workpiece is detected as the amount of deformation by an optical type length measuring equipment, an eddy current type length measuring equipment, a differential transformer type length measuring equipment, an ultrasonic type length measuring equipment, a strain gage, etc. and the deformation of the main body of the electric discharge machine by the working reaction is restrained by changing the machining conditions of the workpiece by the detected value. Therefore, both the machining speed and the machining accuracy can be promoted while a stable machining state can be maintained.

According to the fourth aspect of the present invention the state quantity caused in the main body of the electric discharge machine by the working reaction between the electrode and the workpiece is detected by the amount of force or the amount of deformation and the deformation of the main body of the electric discharge machine by the working reaction is restrained by changing the machining conditions such as an onset timing of the jump motion, a continuous discharge time period of the pulses, an on time or an off time of each of the pulses, a current value or a gap voltage of the pulses, a switching of sucking and exhausting a machining fluid, an amount of sucking or exhausting the machining fluid, a pressure of sucking or exhausting the machining fluid or the like. Therefore, both the machining speed and the machining accuracy are promoted while a stable machining state can be maintained.

According to the fifth aspect of the present invention, the state quantity caused in the main body of the electric discharge machine is detected by the working reaction in the gap between the electrode and the workpiece and the deformation of the main body of the electric discharge machine by the working reaction can be restrained by performing the second jump motion restraining the working reaction in accordance with the state quantity. Therefore, both the machining speed and the machining accuracy are promoted while a stable machining state can be maintained.

According to the sixth aspect of the present invention, the state quantity caused in the main body of the electric discharge machine by the working reaction between the electrode and the workpiece is detected and it is determined that the machining operation of the workpiece has been finished when the detected value is equal to or less than a predetermined value. Therefore, both the machining speed and the machining accuracy are promoted while a stable machining state can be maintained.

According to the seventh aspect of the present invention, the state quantity caused in the main body of the electric discharge machine by the working reaction between the electrode and the workpiece is detected and the machining path determining a position of the electrode relative to the workpiece is corrected. Therefore, both the machining speed and the machining accuracy are promoted while a stable machining state can be maintained.

What is claimed is:

1. An electric discharge machine for machining a workpiece, disposed within a main body of the electric discharge machine, by an electric discharge by supplying a machining fluid to a gap between an electrode and the workpiece and supplying pulses to the workpiece while providing the electrode with a jump motion, the jump motion being a periodic motion of the electrode relative to the workpiece, said electric discharge machine comprising:

a detector which detects a reactive force produced by a machining operation in the gap between the electrode and the workpiece; and completion circuitry which determines that the machining operation on the workpiece has been finished when the output of said detector is equal to or less than a predetermined value of an allowable reactive force.

2. The electric discharge machine as recited in claim 1, wherein said completion circuitry comprises:

first means, operatively connected to said detector, for generating an instruction indicative of machining depth evaluation responsive to a reactive force produced by the machining operation in the gap; and second means, receiving said instruction, for determining completion of the machining operation.

3. The electric discharge machine as recited in claim 1, wherein said completion circuitry comprises:

a machining depth evaluation controller, operatively connected to said detector, which generates an instruction indicative of machining depth evaluation responsive to a reactive force produced by the machining operation in the gap; and a machining controller, receiving said instruction, which determines completion of the machining operation.

4. An electric discharge machine for machining a workpiece, disposed within a main body of the electric discharge machine, by an electric discharge by supplying a machining fluid to a gap between an electrode and the workpiece and supplying pulses to the workpiece while providing the electrode with a jump motion, the jump motion being a periodic motion of the electrode relative to the workpiece, said electric discharge machine comprising:

a detector which detects an amount of a deformation caused in a main body of the electric discharge machine by the reactive force; and completion circuitry which determines that the machining operation on the workpiece has been finished when the output of said detector is equal to or less than a predetermined value of an allowable deformation.

5. The electric discharge machine as recited in claim 4, wherein said completion circuitry comprises:

first means, operatively connected to said detector, for generating an instruction indicative of machining depth evaluation responsive to a deformation amount of the main body of the electric discharge machine; and second means, receiving said instruction, for determining completion of the machining operation.

6. The electric discharge machine as recited in claim 4, wherein said completion circuitry comprises:

a machining depth evaluation controller, operatively connected to said detector, which generates an instruction indicative of machining depth evaluation responsive to a deformation amount of the main body of the electric discharge machine; and a machining controller, receiving said instruction, which determines completion of the machining operation.

7. An electric discharge machine for machining a workpiece, disposed within a main body of the electric discharge machine, by an electric discharge by supplying a machining fluid to a gap between an electrode and the workpiece and supplying pulses to the workpiece while providing the electrode with a jump motion, the jump motion being a periodic motion of the electrode relative to the workpiece, said electric discharge machine comprising:

a detector which detects a reactive force produced by a machining operation in the gap between the electrode and the workpiece;

a calculator which calculates the amount of deformation from the detected value of the detected force; and completion circuitry which determines that the machining operation on the workpiece has been finished when the output of said detector is equal to or less than a predetermined value of an allowable deformation.

8. The electric discharge machine as recited in claim 7, wherein said completion circuitry comprises:

first means, operatively connected to said calculator, for generating an instruction indicative of machining depth evaluation responsive to a deformation amount of the main body of the electric discharge machine; and second means, receiving said instruction, for determining completion of the machining operation.

9. The electric discharge machine as recited in claim 7, wherein said completion circuitry comprises:

a machining depth evaluation controller, operatively connected to said calculator, which generates an instruction indicative of machining depth evaluation responsive to a deformation amount of the main body of the electric discharge machine; and a machining controller, receiving said instruction, which determines completion of the machining operation.

* * * * *